(12) United States Patent
von Linsowe

(10) Patent No.: US 8,307,949 B2
(45) Date of Patent: Nov. 13, 2012

(54) EXHAUST DEVICE

(75) Inventor: Linwood von Linsowe, Warren, MI (US)

(73) Assignee: MPG Tech, LLC, Bloomfield Hills, MI (US)

( * ) Notice: Subject to any disclaimer, the term of this patent is extended or adjusted under 35 U.S.C. 154(b) by 57 days.

(21) Appl. No.: 13/028,743

(22) Filed: Feb. 16, 2011

(65) Prior Publication Data

US 2012/0012419 A1    Jan. 19, 2012

Related U.S. Application Data

(60) Provisional application No. 61/364,162, filed on Jul. 14, 2010.

(51) Int. Cl.
*F01N 1/08*   (2006.01)
(52) U.S. Cl. ........................ 181/264; 181/212
(58) Field of Classification Search .................. 181/264, 181/212
See application file for complete search history.

(56) References Cited

U.S. PATENT DOCUMENTS

| | | | | |
|---|---|---|---|---|
| 981,770 | A * | 1/1911 | Kreis | 181/264 |
| 992,839 | A * | 5/1911 | Symons | 181/264 |
| 1,061,272 | A | 5/1913 | DeWitt | |
| 1,071,528 | A * | 8/1913 | Rapp | 181/264 |
| 1,148,900 | A | 8/1915 | Hunt | |
| 1,162,064 | A * | 11/1915 | Hutton | 181/264 |
| 2,373,231 | A | 2/1944 | DeMuth | |
| 2,458,102 | A | 7/1946 | Schott et al. | |
| 2,485,555 | A | 10/1949 | Bester | |
| 2,609,886 | A | 9/1952 | Harmon | |
| 2,829,731 | A * | 4/1958 | Clayton | 423/212 |
| 4,286,689 | A | 9/1981 | Malmsten | |
| 4,683,978 | A * | 8/1987 | Venter | 181/280 |
| 5,183,976 | A | 2/1993 | Plemons, Jr. | |
| 5,444,197 | A | 8/1995 | Flugger | |
| 5,659,158 | A * | 8/1997 | Browning et al. | 181/268 |
| 5,760,348 | A | 6/1998 | Heuser | |
| 6,024,189 | A * | 2/2000 | Heuser | 181/264 |
| 6,050,363 | A * | 4/2000 | Tu | 181/264 |
| 7,905,319 | B2 * | 3/2011 | Sullivan | 181/250 |

FOREIGN PATENT DOCUMENTS

GB            379458            9/1932

* cited by examiner

*Primary Examiner* — Forrest M Phillips
(74) *Attorney, Agent, or Firm* — Brooks Kushman P.C.

(57) ABSTRACT

In one embodiment, an exhaust device has an inner cone stack assembly made up of connectedly overlapping inner cone components with frustums. The inner cone stack assembly is disposed within an outer shell and connected to the exhaust device using contoured flanges to match the contours of mounting surfaces on the exhaust device. An outer cone stack assembly made up of baffle ring retainers having a number of detents and baffle frustums with ears inserted in the detents. The outer cone stack assembly is also disposed within the outer shell. The cone frustums of the inner cone stack assembly and the baffle frustums of the outer cone stack assembly cooperate to break down particles and attenuate sound.

18 Claims, 7 Drawing Sheets

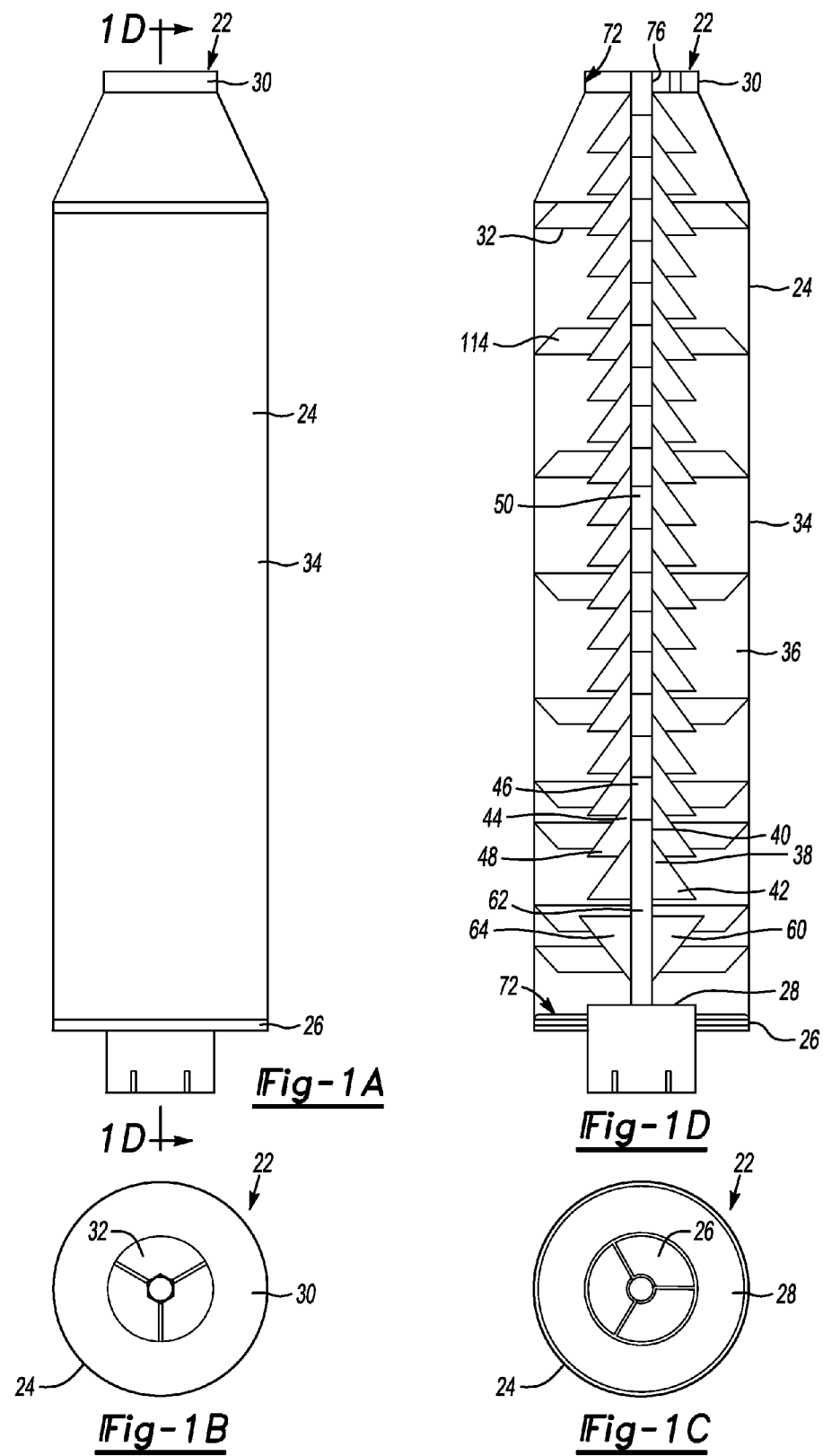

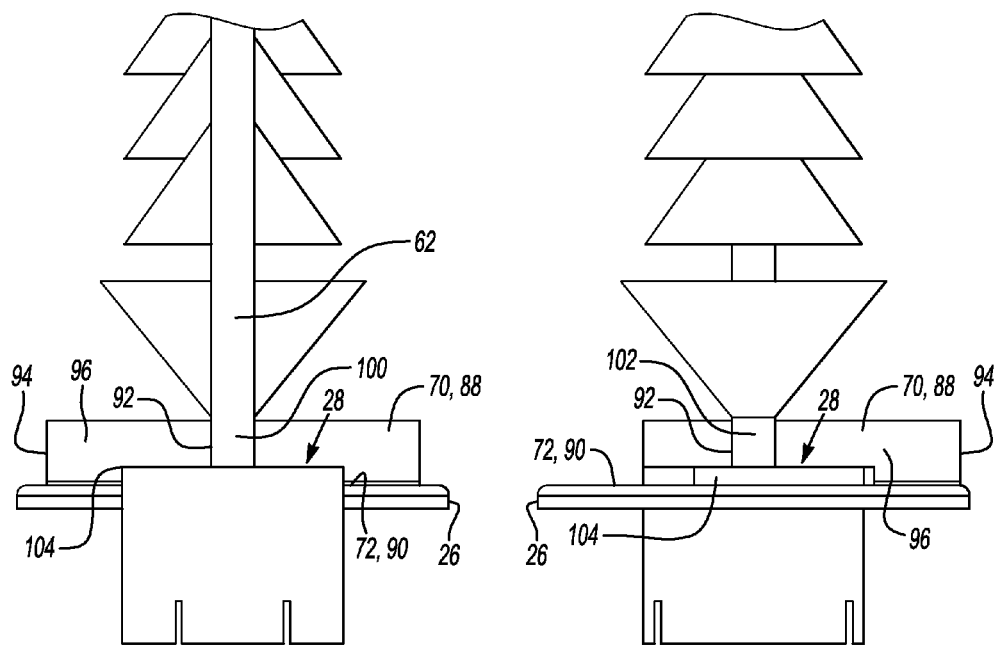
*Fig-7*     *Fig-8*
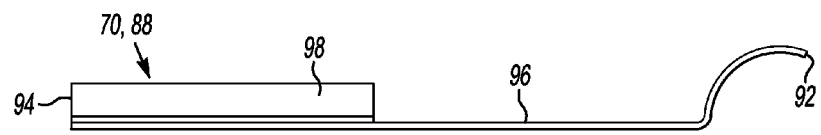
*Fig-9A*
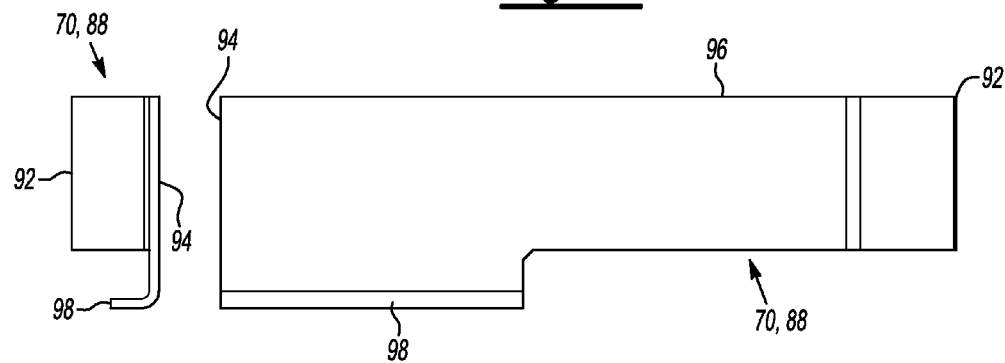
*Fig-9B*     *Fig-9C*

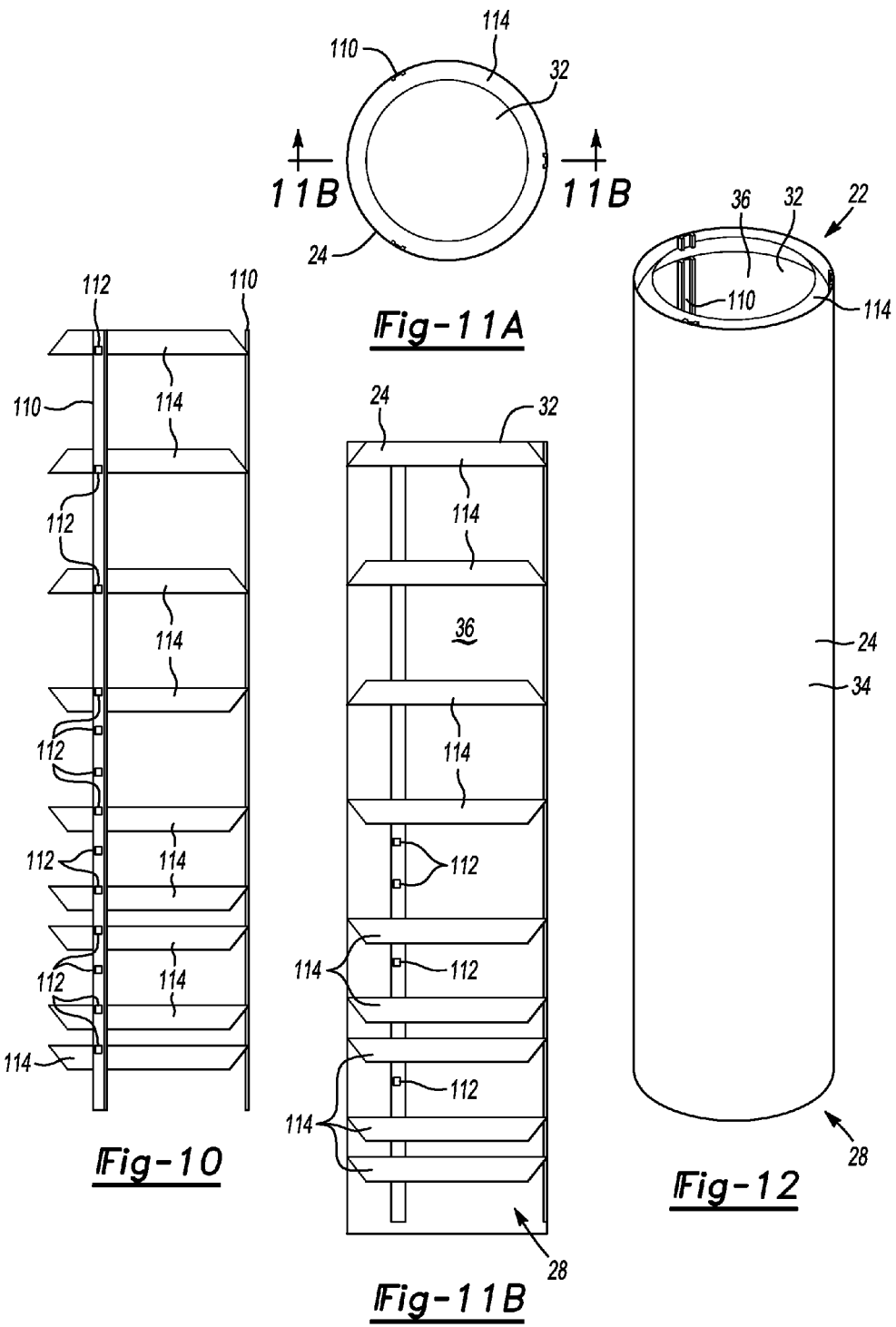

EXHAUST DEVICE

CROSS-REFERENCE TO RELATED APPLICATIONS

This application claims the benefit of U.S. provisional Application No. 61/364,163 filed Jul. 14, 2010. The disclosure of which is incorporated in its entirety by reference herein.

BACKGROUND

1. Technical Field

The invention relates to exhaust devices for breaking down particles passing through the exhaust device.

2. Background Art

Diesel particulate filters, DPFs, have been utilized to reduce the size and amount of soot particles emitted from the exhaust gas of a diesel engine. DPFs are not designed to reduce noise associated with exhaust emitted by internal combustion.

A noise attenuating device, such as a muffler, is a device for reducing the amount of noise associated with the exhaust emitted by internal combustion. The muffler attenuates the noise as the exhaust is blown out through the muffler. Mufflers are not designed to reduce the size or amount of soot particles.

SUMMARY

One embodiment of the present invention is to break down soot particles emitted from the exhaust gas of a diesel engine. Another embodiment of the present invention is to attenuate noise associated with the exhaust emitted by internal combustion. These embodiments may be realized while producing little to no back-pressure in the engine. The following structural embodiments disclosed are used in part or in combination to achieve pollution reduction, both in the form of air and noise.

One embodiment is an exhaust device with an inner cone stack assembly made up of a diverter frustum near an inlet which tapers radially outwardly from the inlet to an outlet and a series of inner cone components with frustums that taper radially inwardly from the inlet to the outlet. One or more of the series of inner cone components with frustums may taper radially outwardly from the inlet to the outlet. Each inner cone component, as well as the diverter component, connectedly overlaps an adjacent inner cone component to form a self-supporting inner cone assembly structure. In this embodiment, the inner cone assembly is disposed within an interior chamber of the exhaust device and concentrically aligned on a central axis. The exhaust device may be coated to improve the strength and/or the appearance of the exhaust device.

Another embodiment is an exhaust device with contoured flanges located near an inlet or an outlet. In one of these embodiments, three inlet flanges connect at their inner ends and form a lower mount receiver in which the inner cone stack assembly is press fit inserted and held. The three inlet flanges outer ends are contoured to substantially match an inlet surface profile and hold the inner cone stack assembly upright. In another of these embodiments, three outlet flanges connect at their inner ends and form an upper mount receiver in which an inner cone stack assembly is press fit inserted and held. The three outlet flanges outer ends are contoured to a similar radius as that of a surface defining the outlet of the exhaust device and press fit into the exhaust device. These embodiments may be combined to concentrically align the inner cone stack assembly on a central axis.

In a further embodiment, an exhaust device with an outer cone stack assembly made up of a number of baffle frustums is disclosed. In this embodiment, the baffle frustums have W-shaped ears which are designed to overlap protruding edges of baffle ring retainers and insert into detents along the baffle retainers to form a self-supporting structure. In one further embodiment, the outer diameter profile of the outer cone stack assembly may be press fit insert into the exhaust device. In another further embodiment, the baffle ring retainers have notches along a protruding edge allowing a welder head to touch a central channel and weld the baffle ring retainer to the exhaust device. In yet another further embodiment, an outer cone stack assembly with three baffle frustums nearest an outlet taper radially inwardly from the inlet to an outlet, while a number of additional baffle frustums nearer the inlet taper radially outwardly from the inlet to the outlet.

In an additional embodiment an outer cone assembly with an outer and inner profile diameter may be press fit into an exhaust device, and a self-supporting inner cone stack assembly with an outer profile diameter, in cooperation with contoured upper and lower flanges, may be press fit into the exhaust device, such that the outer cone assembly inner profile diameter is larger than the inner cone assembly outer profile diameter allowing the inner cone stack assembly to slide within the outer cone stack assembly without interference during assembly.

BRIEF DESCRIPTION OF THE DRAWINGS

FIGS. 1A, 1B, 1C and 1D are a side view, a top view, a bottom view, and a sectioned view A-A, respectively, of an embodiment of an exhaust device;

FIG. 7 is a sectioned view of an embodiment showing a proximal end, an inlet surface profile, inlet flanges, and a partial inner cone stack assembly;

FIG. 8 is a side view of an embodiment showing a partial inner cone stack assembly;

FIGS. 9A, 9B and 9C are top, front, and side views of an embodiment of an inlet flange;

FIG. 10 is a side view of an embodiment of an outer cone stack assembly;

FIG. 11A is a top view of an embodiment of an outer cone stack assembly disposed within an outer shell and FIG. 11B is a section view at section A-A from FIG. 11A;

FIG. 12 is a perspective view of an embodiment of the outer cone stack assembly disposed within an outer shell;

DETAILED DESCRIPTION

Figure 2A:
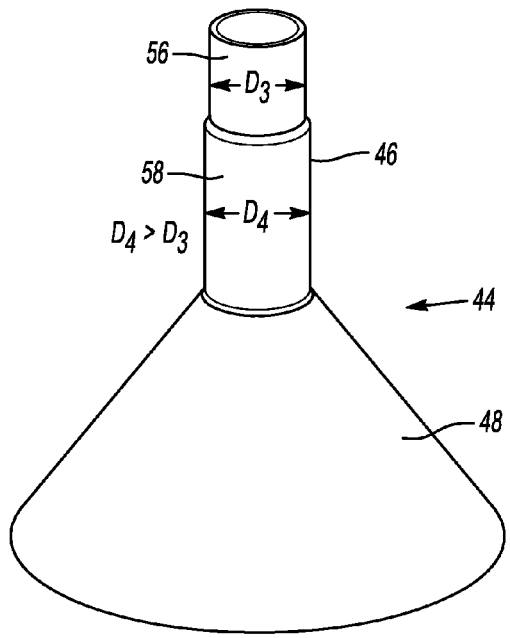
FIGS. 2A and 2B are perspective views of an embodiment at a first and a second inner cone assembly, respectively.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Diesel particulate filters, DPFs, have been utilized to reduce the size and amount of soot particles emitted from the exhaust gas of a diesel engine. DPFs are not designed to reduce noise associated with exhaust emitted by internal combustion.

Particulate filters have to be maintained through replacement, regeneration or cleaning. DPFs may create back-pressure in the exhaust flow lowering horsepower and increasing fuel consumption.

A noise attenuating device, such as a muffler, is a device for reducing the amount of noise associated with the exhaust emitted by internal combustion. The muffler attenuates the noise as the exhaust is blown out through the muffler. Mufflers are not designed to reduce the size or amount of soot particles. A muffler may have reflective surfaces designed to cause destructive interference by changing the direction of the exhaust gas flow and associated sound waves. Destructive interference occurs when opposite direction sound waves collide with oncoming sound waves and cancel each other out. An internal chamber in a muffler may be a resonating chamber designed to create reflected sound waves that interfere with incoming sound waves and cancel each other out. Mufflers often restrict flow, especially when reflecting the exhaust gas flow directly back upon itself, which causes back-pressure in the engine. Back-pressure in the engine may result in lower horsepower performance and lower fuel economy.

Regarding FIGS. 1A-1D, an embodiment of the exhaust device 22 is shown with an outer shell 24 having a proximal end 26 defining an inlet 28 and a distal end 30 defining an outlet 32. The exhaust device 22 may be used to reduce pollution, both in the form of air and noise, released by combustion gas emitted by an internal combustion engine. The outer shell 24 also has a central section 34 between the proximal end 26 and distal end 30 which defines an interior chamber 36. In this embodiment there is shown a first inner cone component 38 with a first cylindrical segment 40 and a first frustum segment 42. The first inner cone component 38 is disposed within the interior chamber 36. In this embodiment there is also shown a second inner cone component 44 with a second cylindrical segment 46 and a second frustum segment 48. The second inner cone component 44 is also disposed within the interior chamber 36. A portion of the second cylindrical segment 46 connectedly overlaps a portion of the first cylindrical segment 40 to form a portion of an inner cone stack assembly 50. The entire inner cone stack assembly 50 is disposed within the interior chamber 36 of the exhaust device 22.

In one embodiment the assembled exhaust device 22 is treated with multiple layers of a powder nickel coating to increase the hardness of the finished product. A non-limiting example of a coating process for these purposes is offered by Galco Electronics of Mesquite, Tex. This coating may improve the appearance of the exhaust device, strengthen the exhaust device, and/or strengthen the welds of the exhaust device. In certain embodiments, the Brinell hardness rating may be increased by 1, 2, 3, 4, 5 or 6 by the powder nickel coating process. The Brinell hardness rating of the untreated assembled exhaust device may be in the range of 26 to 28.

In one embodiment the outer shell 24 is made from SAE 304 stainless steel of a 0.048 inch thickness. In a further embodiment the inner cone stack assembly 50 is also made from SAE 304 stainless steel. However, any material suitable for use with exhaust could be used.

The outer diameter of the outer shell 24 may be varied according to embodiments of the present invention. Non-limiting examples of outer diameters include 5", 7", 9" and 10".

Figure 2B:
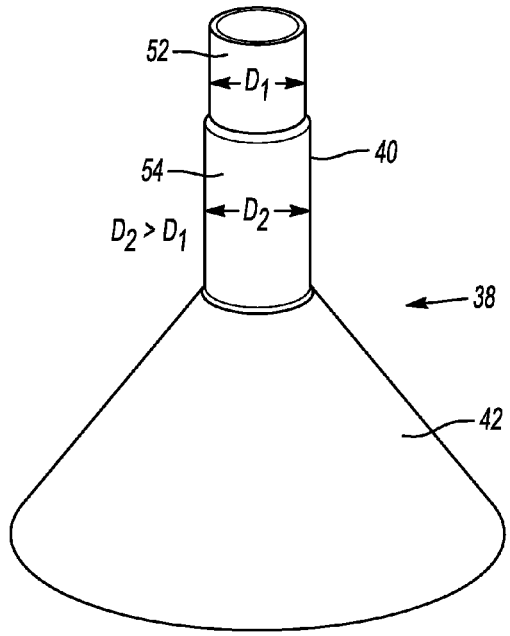

Regarding FIGS. 2A and 2B, another embodiment of the present invention in which the first inner cone component 38 and second inner cone component 44 are shown as individual components. The first inner cone component 38 and second inner cone component 44 may be spun or orbit formed as single unitary pieces, or they may be formed by joining separate cylindrical segments and frustum segments to form cone components. In certain embodiments, the Brinell hardness rating may be increased by 1, 2, 3, 4, 5 or 6 by the spun or orbit forming process. The Brinell hardness rating of the unformed components may be in the range of 26 to 28. In one embodiment the first cylindrical segment 40 is formed with a first upper segment 52 having a first diameter $D_1$ and a first lower segment 54 having a second diameter $D_2$. The second cylindrical segment 46 is formed with a second upper segment 56 having a third diameter $D_3$ and a second lower segment 58 having a fourth diameter $D_4$. The cones are designed such that the first diameter $D_1$ and the third diameter $D_3$ are substantially similar, as well the second diameter $D_2$ and fourth diameter $D_4$ are substantially similar. As well, the second diameter $D_2$ is greater than the first diameter $D_1$, and the fourth diameter $D_4$ is greater than the third diameter $D_3$. In this embodiment the second lower segment 58 is designed to connectively overlap the first upper segment 52. The first inner cone component 38 is inserted in to the second inner cone component 44 as shown by the arrow in the figure. Additional inner cone components of similar design may then be added to the top of the second inner cone component 44. In yet a further embodiment the diameters chosen, in combination with the thickness of the material used, may be optimized to create a press fit between the inner cone components diminishing rattle concerns and allowing for easier assembly.

Figure 3:
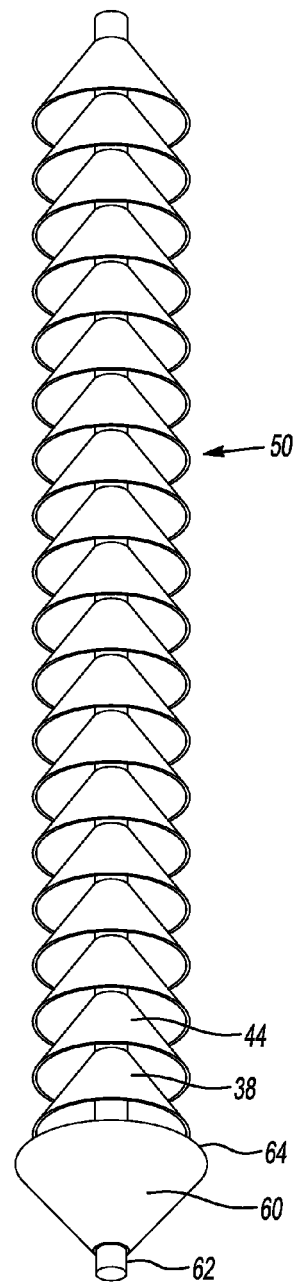
FIG. 3 is a perspective view of an embodiment of an inner cone stack assembly.

Regarding FIG. 3, an embodiment of an inner cone stack assembly 50 is shown with a diverter component 60. The diverter component 60 has a diverter cylindrical segment 62 and a diverter frustum segment 64. The diverter component 60 is also disposed within the interior chamber 36 (shown in FIGS. 1A-1D) such that a portion of the first cylindrical segment 40 overlaps a portion of the diverter cylindrical segment 62 to form a portion of the inner cone stack assembly 50 of the exhaust device 22. The top of the diverter cylindrical segment 62 has a diameter (not shown) similar to that of the first upper segment 52 and the top of the diverter cylindrical segment (not shown) is inserted into the first lower segment 54. In yet a further embodiment the diameter of the top of the diverter cylindrical segment (not shown) may be optimized to create a press fit between the inner cone components diminishing rattle concerns and allowing for easier assembly.

FIG. 3 also shows an embodiment of the exhaust device 22 in which the diverter frustum segment 64 taper direction opposes the first frustum segment 42 taper direction. In one embodiment the first frustum segment 42 and the second frustum segment 48 taper radially inwardly from the inlet 28 to the outlet 32. In another embodiment, one or more of the frustum sections may taper radially outwardly from the inlet 28 to the outlet 32. In another embodiment the diverter frustum segment 64 tapers radially outwardly from the inlet 28 to the outlet 32. In yet another embodiment the inner cone stack assembly 50 is concentrically aligned on a central axis.

Each of the frustum sections may have the same size and shape and may be disposed an equal length from each other for purposes of the noise attenuating function. In other embodiments, the size, shape and/or location of one or more of the frustum sections may be varied to achieve the noise attenuating function.

Although the cylindrical segments of the inner cone assemblies will be somewhat uniform to allow for manufacturing uniformity and interchangeability of inner cone components in the inner cone stack assembly, it should be understood that frustum angles may vary from 25° to 45° to allow for greater particle impingement and destructive interference. As well, the cylindrical segments and frustum segments shown in the figures appear frustoconical (having the shape of a frustum of a cone), however other segment shapes may be used such as, but not limited to, triangles, squares, rectangles, pentagons, hexagons, heptagons, octagons, enneagons (or nonagons), decagons, hendecagons, dodecagon, and star shapes, or any combination of the above. The above design of the inner cone stack assembly 50 allows for a self-supporting structure and eliminates any need for outside brackets or a central rod.

Figure 4:
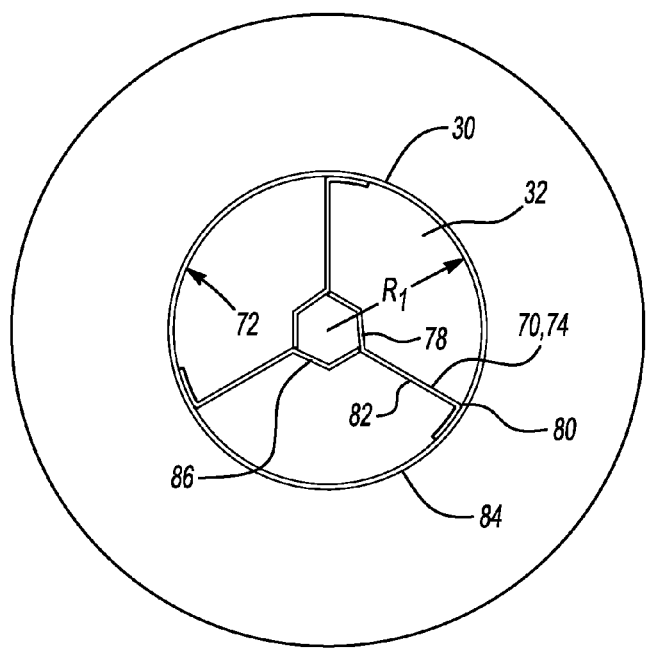
FIG. 4 is a top view of an embodiment showing three outlet flanges attached to a distal end outlet and each other.
Figure 5:
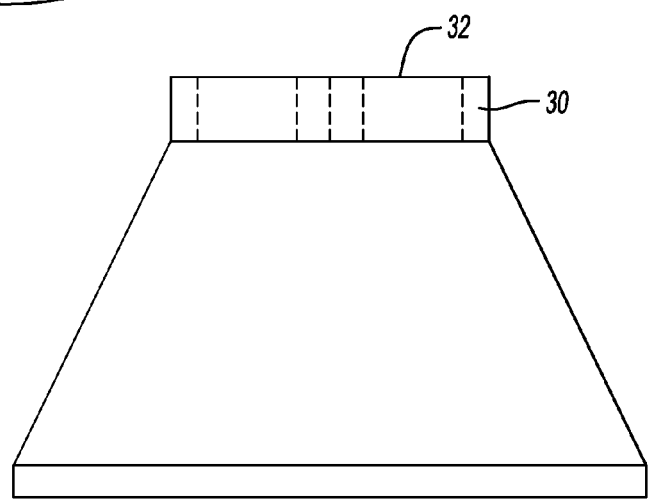
FIG. 5 is a side view of an embodiment of a distal end of the outer shell.
Figure 6:
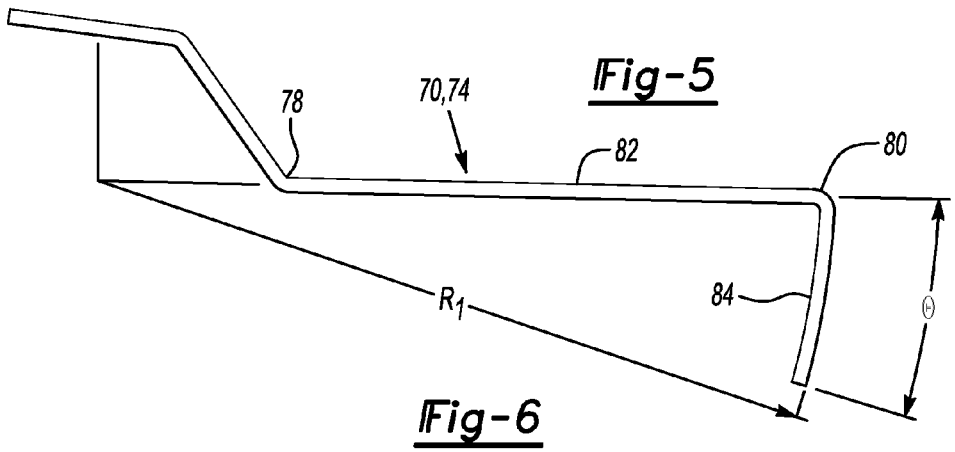
FIG. 6 is an embodiment of an outlet flange.
Figure 13A:
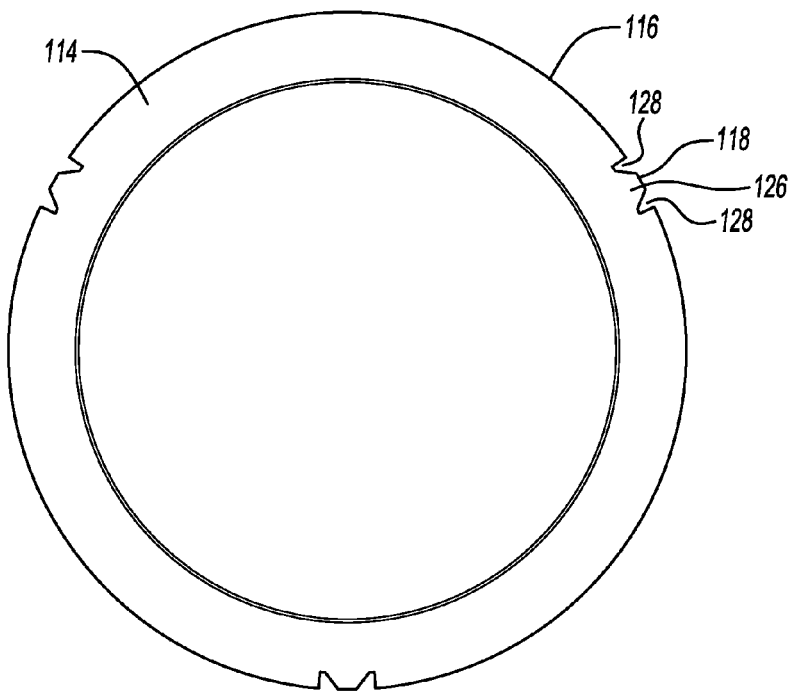
FIGS. 13A and 13B are a top view and a side view, respectively, of an embodiment of a baffle frustum.
Figure 13B:
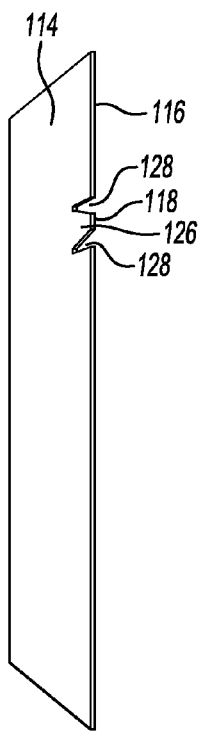
Figure 14A:
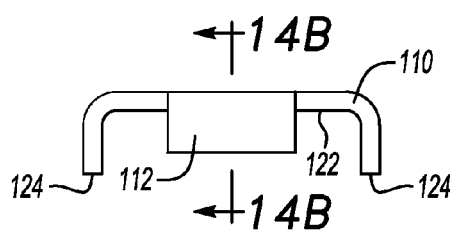
FIG. 14A is a top view and FIG. 14B is a partial sectioned view at section C-C of FIG. 14A of an embodiment of a baffle ring retainer.
Figure 14B:
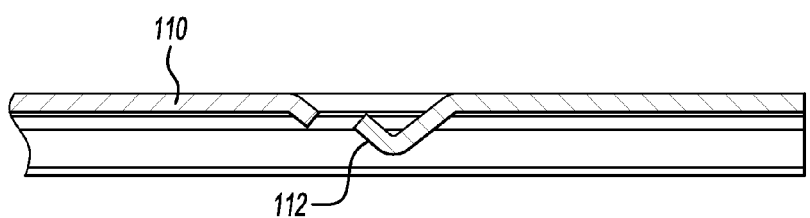
Figure 15:
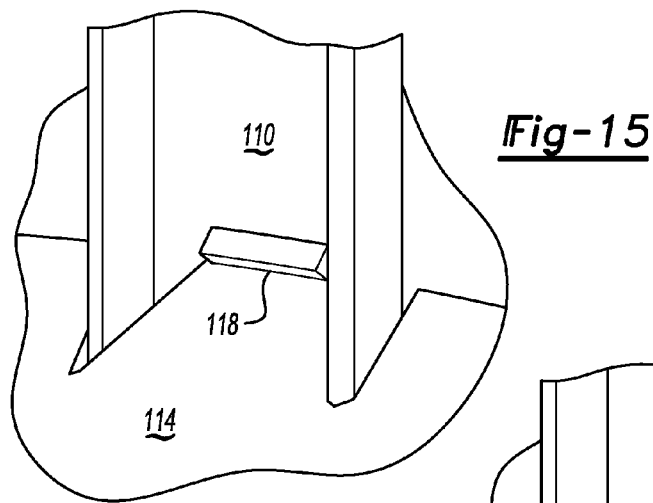
FIG. 15 is a front perspective view of an embodiment of a baffle frustum outer edge ear inserted in a detent.
Figure 16:
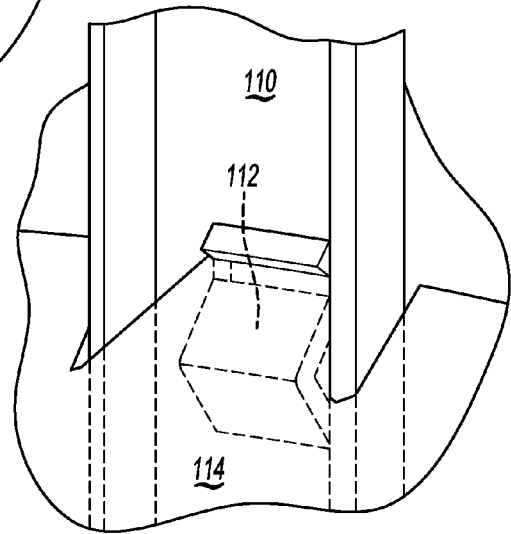
FIG. 16 is the perspective view of FIG. 15 with the baffle frustum made transparent.
Figure 17:
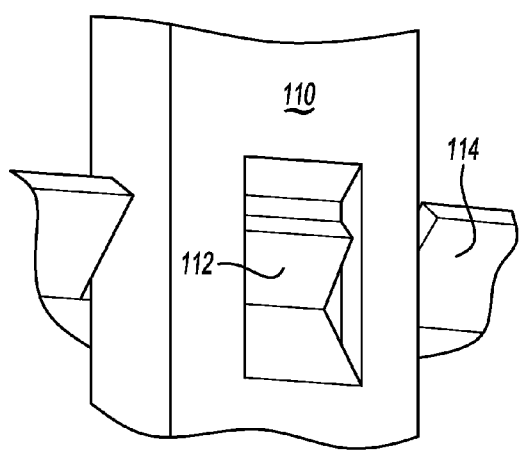
FIG. 17 is a rear perspective view of an embodiment of a baffle frustum outer edge ear inserted in a detent.

FIGS. 4-6 show an embodiment of a flange 70 located at the outlet 32. In this embodiment, the distal end 30 defines an outlet 32 with a contoured flange mounting surface 72. A flange 70 used at the outlet 32 is an outlet flange 74. The inner cone stack assembly 50 has an upper mounting portion 76 (shown in FIGS. 1A-1D) at the top of the cylindrical segment of the upper most inner cone component. In one embodiment only a single outlet flange 74 is used (not shown). In the embodiment shown, three outlet flanges 74 are used, each having an inner end 78, an outer end 80, and an extending member 82 between the inner end 78 and the outer end 80. The inner end 78 is connected to the mounting portion 72 of the inner cone stack assembly 50 (not shown), and the outer end 80 has a contoured tab 84 connected to the contoured flange mounting surface 72. The contoured flange mounting surface 72 at the outlet 32 has a radius $R_1$ and the contoured tab 84 of each upper flange 72 has substantially the same radius $R_1$. In one embodiment the extending member 82 has a length and the contoured tab 84 is bent to a degree θ to correspond with the radius $R_1$.

In another embodiment the flanges 72 are each connected at their inner ends 78. The inner ends 78 cooperate to form an upper mount receiver 86. The upper mount receiver 86 connectedly overlaps the upper mounting portion 76 of the inner cone stack assembly 50. In this embodiment the inner ends 78 are bent to form a section of a polygon, and when the inner ends 78 of the three flanges 72 are connected to each other they complete a hexagon. However other shapes may be formed such as, but not limited to, circles, ovals, triangles, squares, rectangles, pentagons, hexagons, heptagons, octagons, enneagons (or nonagons), decagons, hendecagons, dodecagon, and star shapes. In yet another embodiment the outlet flanges 74 may be optimized to create a press fit between the upper mount receiver 86 and the upper mounting portion 76 to diminishing rattle concerns and allowing for easier assembly. As well, the outlet flanges 74 may be optimized to have a radius $R_1$ slightly larger than the outlet 32 contoured flange mounting surface 72 to create a press fit to diminish rattle and allow for easier assembly.

FIGS. 7-9C show an embodiment of a flange 70 used at the inlet 28. In this embodiment, the proximal end 26 has a contoured flange mounting surface 72 extending inwardly from the central section 34. A flange 70 used at the inlet 28 is an inlet flange 88. The contoured flange mounting surface 72 defines an inlet surface profile 90. The inlet flange has an inner end 92, an outer end 94, and an extending member 96 disposed between the inner end 92 and the outer end 94. The outer end 94 has a base tab 98, such that the base tab 98 has a substantially matching profile to the inlet surface profile 90. In one embodiment only a single inlet flange 88 is used (not shown) and is attached to the lower part of the diverter cylindrical segment 62 and to the contoured flange mounting surface 72. The lower part of the diverter cylindrical segment 62 is the lower mounting portion 100 of the inner cone stack assembly 50. The lower mounting portion 100 has a radius $R_2$. In the embodiment shown, three inlet flanges 88 are used, each having an inner end 92 with a circular segment substantially following radius $R_2$. The three inlet flanges 88 are joined at their respective inner ends 92 to form a lower mounting retainer 100. The lower mounting receiver 100 connectedly overlaps the lower mounting portion 102. In another embodiment, the inlet surface profile 90 may be used as the datum surface for assembly, and the inlet flanges 88 cooperate to locate the inner cone stack assembly 50 and to concentrically align the inner cone stack assembly 50 on a central axis.

In the embodiment shown, the inner ends 92 form a section of a circular shape, and when the inner ends 92 of the three inlet flanges 90 are connected to each other they complete the circular shape. However other shapes may be formed such as, but not limited to, ovals, triangles, squares, rectangles, pentagons, hexagons, heptagons, octagons, enneagons (or nonagons), decagons, hendecagons, dodecagon, and star shapes. In yet another embodiment the inlet flanges 90 may be optimized to create a press fit between the lower mount receiver 102 and the lower mounting portion 100 to diminishing rattle concerns and allowing for easier assembly. In the embodiment shown, the proximal end 26 has a lip 104 and the inlet flanges 88 are designed so as to not come in contact with the lip 104 to eliminate noise concerns with component rubbing and vibrations.

In yet another embodiment the proximal end 26 is designed to prevent "oil canning." A semi-truck cab may experience movement of up to 2½ inches relative to an exhaust system base mount (not shown). This cab movement may be transferred into the exhaust system. When an embodiment of the exhaust device 22 is used on the exhaust system of a semi-truck and attached to both the backside of the cab and the base mount, the exhaust device 22 may be subject to forces caused by the cab movement. The 2½ inch displacement may cause compression and tension on the exhaust system and can cause surfaces perpendicular to the movement to pop back and forth like the bottom of an old style oil can. The proximal end may be made from different materials, such as but not limited to SAE 304 stainless steel of a 0.062 inch thickness. The proximal end may also have deferring profiles to reduce the deflection (not shown). In the case of an inlet surface profile 90 of differing shapes, the base tabs 98 are designed to match the inlet surface profile 90.

FIGS. 10-12 show an embodiment in which the exhaust device 22 has an outer shell 24 having an inlet 28, an outlet 32, and a central section 34 defining an interior chamber 36. There is at least one baffle ring retainer 110 disposed within the interior chamber 36 adjacent the outer shell 24 central section 34. Each baffle ring retainer 110 has a number of detents 112. As well there are a number of baffle frustums 114 disposed within the interior chamber 36, each of the number of baffle frustums 114 having an outer edge 116 with at least one ear 118. In this embodiment each ear 118 inserts into a corresponding detent 112 to form an outer cone stack assembly 120. In one embodiment only a single baffle ring 110 retainer is used. In the embodiment shown, three baffle ring retainers are used 110. It should be understood that not all detents 112 must be filled by ears 118, as well not all ears 118 must be placed into a detent 112.

In one embodiment the baffle frustum 114 nearest the outlet 32 tapers radially inwardly from the inlet 28 to the outlet 32. In the embodiment shown in FIGS. 10 and 11B, three of the baffle frustums 114 nearest the outlet 32 taper radially inwardly from the inlet 28 to the outlet 32. In other non-limiting embodiments, one, two, four or five of the baffle frustums 114 nearest the outlet 32 taper radially inwardly from the inlet 28 to the outlet 32. Tapering the baffle frustums 114 nearest the outlet 32 in such an orientation creates a venturi effect which minimizes back-pressure in the exhaust system. In another embodiment, the remaining baffle frustums 114 taper radially outwardly from the inlet 28 to the outlet 32. In yet another embodiment, the one or more of the remaining baffle frustums 114 taper radially inwardly from the inlet 28 to the outlet 32.

Each of the baffle frustums may have the same size and shape and may be disposed an equal length from each other for purposes of the noise attenuating function. In other embodiments, the size, shape and/or location of one or more of the baffle frustums may be varied to achieve the noise attenuating function.

In FIGS. 13A, 13B, 14A and 14B, an embodiment of the baffle ring retainer 110 is shown that includes a central channel 122 defining the number of detents 112 and two protruding edges 124 running along both sides of the central channel 122. The two protruding edges 124 extend inwardly into the interior chamber 36 (best shown in FIGS. 11A, 11B and 12). In another embodiment, the ear 118 includes a center protrusion 126 and defines two valleys 128 on each side of the center protrusion. In yet another embodiment, the ear 118 is inserted into the corresponding detent 112 such that the two valleys 128 of the generally W shaped ear 118 overlap the two protruding edges 124 of the generally U shaped baffle ring retainer 110 and the center protrusion 126 is inserted into the detent 112. The design of the detent 112 and ear 118 is such that a press fit occurs which diminishes rattle and allows for easier assembly.

Figure 18:
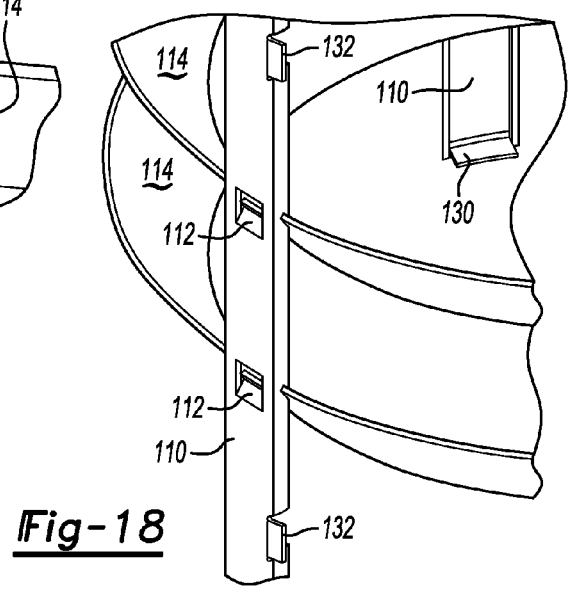
FIG. 18 is a perspective view of an embodiment showing a notch and bottom end on a partial outer cone stack assembly.

In one embodiment the baffle ring retainers 110 have bottom end 130 that abut the inlet surface profile 90, such that the inlet surface profile 90 may be used as a datum for the outer cone stack assembly 120 during assembly. In another embodiment, the design of the outer cone stack assembly 120 has a press fit within the outer shell 24 to diminish rattle and allow for easier assembly. In another embodiment, the baffle ring retainers 110 are attached to the outer shell 24. In yet another embodiment, the baffle ring retainers 110 are welded to the outer shell 24 central section 34. In this embodiment, each baffle ring retainer 110 has a notch 132 in one of the protruding edges 124 (best seen in FIG. 18), such that the notch 132 is used to provide a locater relative to the outer shell. The notch 132 allows for a laser tack welder head to touch the central channel 122 of the baffle ring retainer 110 and weld through the baffle ring retainer 110 to the outer shell 24. It should be known that attachment of all components listed above may be done with a laser welder, however other forms of attachment and other attachment devices may be used.

In one embodiment, the outer cone stack assembly 120 has an outer diameter profile (not shown) and the inner cone stack assembly 50 has inner diameter profile (not shown), such that the outer diameter profile is greater than the inner diameter profile allowing the inner cone stack assembly 50 to be inserted within the outer cone stack assembly 120 during assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

While the best mode for carrying out the invention has been described in detail, those familiar with the art to which this invention relates will recognize various alternative designs and embodiments for practicing the invention as defined by the following claims.

What is claimed is:

1. An exhaust device comprising:
    an outer shell having a proximal end defining an inlet, a distal end defining an outlet, and a central section between the proximal end and distal end, the central section defining an interior chamber;
    a first inner cone component with a first cylindrical segment and a first frustum segment, the first inner cone component disposed within the interior chamber; and a second inner cone component with a second cylindrical segment and a second frustum segment, the second inner cone component disposed within the interior chamber, wherein a portion of the second cylindrical segment connects to and overlaps a portion of the first cylindrical segment to form a connected overlapping section and a portion of an inner cone stack assembly disposed within the interior chamber of the exhaust device,
    wherein the first cylindrical segment has a first upper segment and a first lower segment, the second cylindrical segment has a second upper segment and a second lower segment, and the second lower segment connects to and overlaps the first upper segment,
    wherein the first upper segment has a first outer diameter, the first lower segment has a second outer diameter, the second upper segment has a third outer diameter, the second lower segment has a fourth outer diameter, and the fourth outer diameter is greater than the first outer diameter.

2. The exhaust device of claim 1, wherein the exhaust device is a nickel powder coated exhaust device having a Brinell hardness rating in the range of 36 to 42.

3. The exhaust device of claim 1, further comprising:
    a diverter component with a diverter cylindrical segment and a diverter frustum segment, the diverter component disposed within the interior chamber, such that a portion of the first cylindrical segment overlaps a portion of the diverter cylindrical segment to form a portion of an inner cone stack assembly disposed within the interior chamber of the exhaust device.

4. The exhaust device of claim 3, wherein the diverter frustum segment taper direction opposes the first frustum segment taper direction.

5. The exhaust device of claim 1, wherein the first frustum segment and the second frustum segment taper radially inwardly from the inlet to the outlet.

6. The exhaust device of claim 1, wherein a third frustum segment tapers radially outwardly from the inlet to the outlet.

7. The exhaust device of claim 1, wherein the portion of the inner cone stack assembly is concentrically aligned on a central axis.

8. An exhaust device comprising:
- an outer shell having a proximal end defining an inlet, a distal end defining an outlet, and a central section between the proximal end and distal end defining an interior chamber,
- a number of inner cone components each having a cylindrical segment extending from an inward tapered end of a frustum segment, wherein the cylindrical segments of adjacent inner cone components connect to and overlap each other to form an inner cone stack assembly disposed within the interior chamber, the inner cone stack assembly having a mounting portion formed from at least one of the cylindrical segments,
- wherein the first cylindrical segment has a first upper segment and a first lower segment, the second cylindrical segment has a second upper segment and a second lower segment, and the second lower segment connects to and overlaps the first upper segment,
- wherein the first upper segment has a first outer diameter, the first lower segment has a second outer diameter, the second upper segment has a third outer diameter, the second lower segment has a fourth outer diameter, and the fourth outer diameter is greater than the first outer diameter; and
- at least one flange with an inner end, an outer end, and an extending member between the inner end and the outer end, the inner end providing circumferential coverage around the mounting portion of the inner cone stack assembly, and the outer end connected to the outer shell.

9. The exhaust device of claim 8, wherein the at least one flange is connected to the outer shell at the distal end of the outer shell, the distal end of the outer shell is cylindrical with a radius, the outer end of the at least one flange extends generally perpendicular from the extending member and curves to correspond with the radius.

10. The exhaust device of claim 8, wherein the proximal end of the outer shell has a surface extending inwardly from the central section, the surface defines an inlet surface profile, the outer end of the at least one flange has a base tab, such that the base tab has a substantially matching profile to the inlet surface profile.

11. The exhaust device of claim 8, wherein the at least one flange is a plurality of flanges disposed substantially equidistant from each other around the outer shell, wherein the number of flanges cooperate to provide the circumferential coverage around the mounting portion.

12. An exhaust device comprising:
- an outer shell having a proximal end defining an inlet, a distal end defining an outlet, and a central section between the proximal end and distal end, the central section defining an interior chamber;
- at least one elongated baffle ring retainer substantially parallel to the longitudinal axis of the outer shell central section disposed within the interior chamber adjacent the outer shell central section, the at least one baffle ring retainer having a number of detents; and
- a number of baffle frustums disposed within the interior chamber, each of the number of baffle frustums having an outer edge defining at least one ear, wherein the at least one ear inserts into a corresponding detent of the number of detents to form an outer cone stack assembly.

13. The exhaust device of claim 12, wherein at least one of the number of baffle frustums near the outlet tapers radially inwardly from the inlet to the outlet.

14. The exhaust device of claim 12, wherein the at least one baffle ring retainer includes a central channel defining the number of detents and two protruding edges running along both sides of the central channel, such that the two protruding edges extend inwardly into the interior chamber.

15. The exhaust device of claim 14, wherein the at least one ear includes a center protrusion and two valleys on each side of the center protrusion; and
- wherein the at least one ear is inserted into the corresponding detent of the number of detents, such that the two valleys of the generally W shape overlap the two protruding edges of the generally U shape and the center protrusion is inserted into the detent.

16. The exhaust device of claim 14, wherein the at least one baffle ring retainer has a notch in the protruding edge, such that the notch is used to provide a locater relative to the outer shell.

17. The exhaust device of claim 12, wherein the at least one ear includes a center protrusion and two valleys on each side of the center protrusion.

18. The exhaust device of claim 12, wherein the at least one baffle ring retainer is attached to the outer shell central section.

* * * * *